(12) United States Patent
Baek

(10) Patent No.: US 9,196,894 B2
(45) Date of Patent: Nov. 24, 2015

(54) RECHARGEABLE BATTERY PACK

(71) Applicant: Samsung SDI CO., LTD., Yongin-si, Gyeonggi-do (KR)

(72) Inventor: Woon-Seong Baek, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 124 days.

(21) Appl. No.: 13/792,520

(22) Filed: Mar. 11, 2013

(65) Prior Publication Data

US 2013/0330575 A1    Dec. 12, 2013

Related U.S. Application Data

(60) Provisional application No. 61/657,151, filed on Jun. 8, 2012.

(51) Int. Cl.
| | |
|---|---|
| *H01M 10/42* | (2006.01) |
| *H01M 2/06* | (2006.01) |
| *H01M 2/22* | (2006.01) |
| *H01M 2/34* | (2006.01) |
| *H01M 2/02* | (2006.01) |
| *H01M 10/04* | (2006.01) |

(52) U.S. Cl.
CPC .............. *H01M 2/34* (2013.01); *H01M 2/0212* (2013.01); *H01M 2/0267* (2013.01); *H01M 2/06* (2013.01); *H01M 2/22* (2013.01); *H01M 10/0431* (2013.01); *H01M 10/425* (2013.01); *H01M 2200/00* (2013.01)

(58) Field of Classification Search
CPC ........ H01M 2/06; H01M 2/22; H01M 10/425
USPC .............................................. 429/7, 122–347
See application file for complete search history.

(56) References Cited

U.S. PATENT DOCUMENTS

| | | | |
|---|---|---|---|
| 2005/0142439 A1 | 6/2005 | Lee et al. | |
| 2006/0099503 A1 | 5/2006 | Lee | |
| 2006/0257731 A1* | 11/2006 | Yoon | 429/176 |
| 2009/0081485 A1 | 3/2009 | Heo | |
| 2009/0087693 A1 | 4/2009 | Kim et al. | |

FOREIGN PATENT DOCUMENTS

| | | |
|---|---|---|
| EP | 1717881 A1 | 11/2006 |
| KR | 10-2005-0066120 A | 6/2005 |
| KR | 10-2009-0031158 A | 3/2009 |
| KR | 10-1059756 B1 | 8/2011 |

OTHER PUBLICATIONS

European Search report issued on Oct. 28, 2013 by EPO in connection with Patent Application No. 13163987.4, which claims priority from the present application.

* cited by examiner

*Primary Examiner* — Jonathan G Leong
(74) *Attorney, Agent, or Firm* — Robert E. Bushnell, Esq.

(57) ABSTRACT

A rechargeable battery including a bare cell having an end portion including a first surface portion and a second surface portion projecting from the first surface portion; an insulating member having a first insulating portion attached to the first surface portion and a second insulating portion attached to the second surface portion, the second insulating portion being partially separated from the second surface portion, the first insulating portion forming an angle with the second insulating portion; and a protection circuit module electrically connected to the bare cell, the protection circuit module being disposed on the second insulating member.

18 Claims, 13 Drawing Sheets

RECHARGEABLE BATTERY PACK

CLAIM OF PRIORITY

This application makes reference to, incorporates the same herein, and claims all benefits under 35 U.S.C. §119(e) from U.S. Provisional Application Ser. No. 61/657,151 filed on the 8 of Jun. 2012.

BACKGROUND OF THE INVENTION

1. Field of the Invention

The present disclosure relates to a rechargeable battery installed by attaching a protection circuit module to a bare cell.

2. Description of the Related Art

Unlike a primary battery not available for being rechargeable, a rechargeable battery can be recharged and discharged. A small-capacity rechargeable battery is used for small portable electronic devices such as mobile phones, notebook computers, camcorders, and the like, while a large-capacity rechargeable battery is used as a motor-driving power source for an electric bike, an electric vehicle, a fork lift, or the like.

A rechargeable battery pack includes a bare cell and a protection circuit module (PCM) protecting the bare cell. The protection circuit module includes a circuit board forming a protection circuit for protecting the bare cell against an overcharge, an overdischarge, an overcurrent, and a short, and protection elements mounted on the circuit board.

A pouch type bare cell is configured as a tablet type bare cell, and the bare cell includes a end portion formed at one side of a heat fusion portion of a pouch and the protection circuit module is attached to the end portion by using a double-sided tape. One side of the bare cell and the end portion are formed to be substantially perpendicular to each other, so the double-sided tape is bent at a right angle so as to be attached thereto.

Thus, a process of attaching the protection circuit module is difficult. Also, due to force of restitution of the double-sided tape at the bent portion, the double-sided tape may be separated from the end portion or come off to cause a defective attachment of the protection circuit module and defective pack dimensions.

The above information disclosed in this Background section is only for enhancement of understanding of the background of the described technology and therefore it may contain information that does not form the prior art that is already known in this country to a person of ordinary skill in the art.

SUMMARY OF THE INVENTION

The described technology has been made in an effort to provide a rechargeable battery pack having advantages of enhancing workability of attaching a bare cell and a protection circuit module (PCM) and enhancing attachment performance and accuracy of pack dimensions.

An exemplary embodiment provides a rechargeable battery that may comprise a bare cell having an end portion including a first surface portion and a second surface portion projecting from the first surface portion; an insulating member including a first insulating portion attached to the first surface portion and a second insulating portion attached to the second surface portion, the second insulating portion may be partially separated from the second surface portion, the first insulating portion forming an angle with the second insulating portion; and a protection circuit module electrically connected to the bare cell, the protection circuit module may be disposed on the insulating member.

The first insulating portion may be demarcated from the second insulating portion by a perforated line.

The rechargeable battery may further comprise an adhesive layer disposed between the second insulating portion and the protection circuit module.

The first insulating portion may have a first adhesive layer attached to the first surface portion and a first buffer portion formed on the first adhesive layer, and the second insulating portion may have a second adhesive layer attached to the second surface portion and a second buffer portion formed on the second adhesive layer.

The first insulating portion may further have a first insulating layer formed on the first buffer portion.

The second insulating portion may further have a second insulating layer formed on the second buffer portion.

The first insulating layer may be demarcated from the second insulating layer by a perforated line.

The rechargeable battery may further comprise a hinge portion connecting the first buffer portion to the second buffer portion, the hinge portion may be aligned with the perforated line.

The first buffer portion may be partially separated from the second buffer portion.

An exemplary embodiment provides a rechargeable battery that may comprise: a bare cell having an electrode assembly, the bare cell having an end portion having a first surface portion and a second surface portion projecting from the first surface portion; the electrode assembly having a positive lead tab and a negative lead tab protruding through the second surface portion of the end portion; an insulating member having a first insulating portion attached to the first surface portion and a second insulating portion attached to the second surface portion, the first insulating portion forming an angle with the second insulating portion; and a protection circuit module electrically connected to the positive and negative lead tabs at a back surface portion of the protection circuit module, the back surface portion may be disposed on the second insulating portion of the insulating member attached to the second surface portion, the positive and negative lead tabs deforming corresponding portions of the second insulating portion of the insulating member.

The first insulating portion may have a first adhesive layer attached to the first surface portion and a first buffer portion formed on the first adhesive layer; and the second insulating portion may have a second adhesive layer attached to the second surface portion and a second buffer portion formed on the second adhesive layer.

The first insulating portion may be demarcated from the second insulating portion by a perforated line.

The first insulating portion may further have a first insulating layer formed on the first buffer portion.

The second insulating portion may further have a second insulating layer formed on the second buffer portion.

The first insulating layer may be demarcated from the second insulating layer by a perforated line.

The rechargeable battery may further comprise an adhesive layer disposed between the second insulating portion and the protection circuit module.

The rechargeable battery may further comprise a hinge portion connecting the first buffer portion to the second buffer portion, the hinge portion may be aligned with the perforated line.

The first buffer portion may be partially separated from the second buffer portion.

Since the insulating member is bent on the perforated line, and the cutting line and attached to the end portion, when a protection circuit module is attached to the insulating member, the insulating member can be prevented from coming off Thus, workability of attaching the protection circuit module to the bare cell can be enhanced, and performance of attaching the protection circuit module by the insulating member and accuracy of pack dimensions can be enhanced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
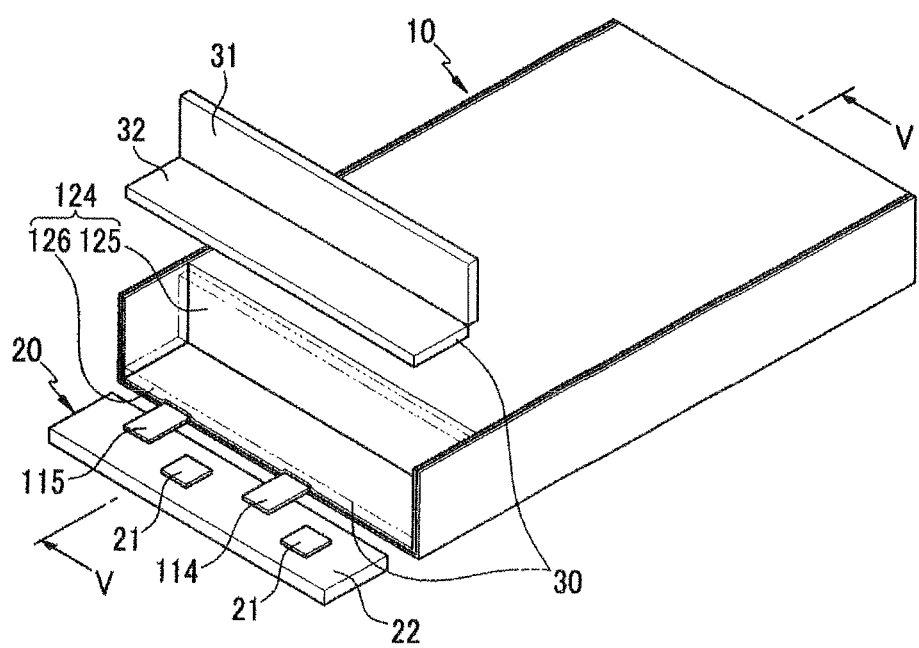
FIG. 1 is a partial exploded perspective view of a rechargeable battery pack according to a first embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
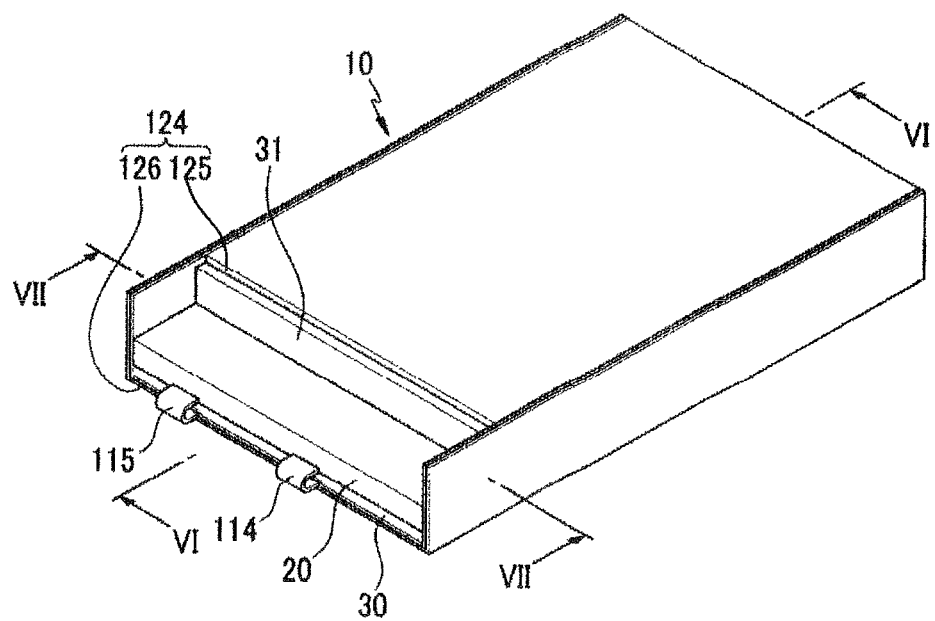
FIG. 2 is a perspective view showing a combined state of the rechargeable battery pack according to the first embodiment of the present invention.

FIG. 1 is a partial exploded perspective view of a rechargeable battery pack according to a first embodiment of the present invention, and FIG. 2 is a perspective view showing a combined state of the rechargeable battery pack according to the first embodiment of the present invention.

With reference to FIGS. 1 and 2, a rechargeable battery pack according to an embodiment of the present invention includes a bare cell 10, a protection circuit module (PCM) 20 electrically connected to the bare cell 10, and a insulating member 30 attaching the protection circuit module 20 to the bare cell 10. Bare cell 10 is a pouch type rechargeable, or secondary, battery, having an end portion 124 which includes a first surface portion 125 and a second surface portion 126.

The rechargeable battery includes a rechargeable electrode assembly (11, FIG. 3) having a positive lead tab 114 and a negative lead tab 115 extending from a end portion 124. The positive and negative lead tabs 114 and 115 are connected to a back surface portion 22 of a protection circuit module (PCM) 20. Mounting protection elements 21 are also connected to the back surface portion 22 of a protection circuit module (PCM) 20.

The insulating member 30 has an area corresponding to the end portion 124, and includes a first portion 31 corresponding to the first surface portion 125 and a second portion 32 corresponding to the second surface portion 126.

As shown in FIG. 2, first portion 31 and second portion 32 of insulating member 30 are attached to first surface portion 125 and second surface portion 126, respectively, of end portion 124. Additionally, back surface portion 22 of protection circuit module 20 is mounted on second portion 32 of insulating member 30.

Figure 3:
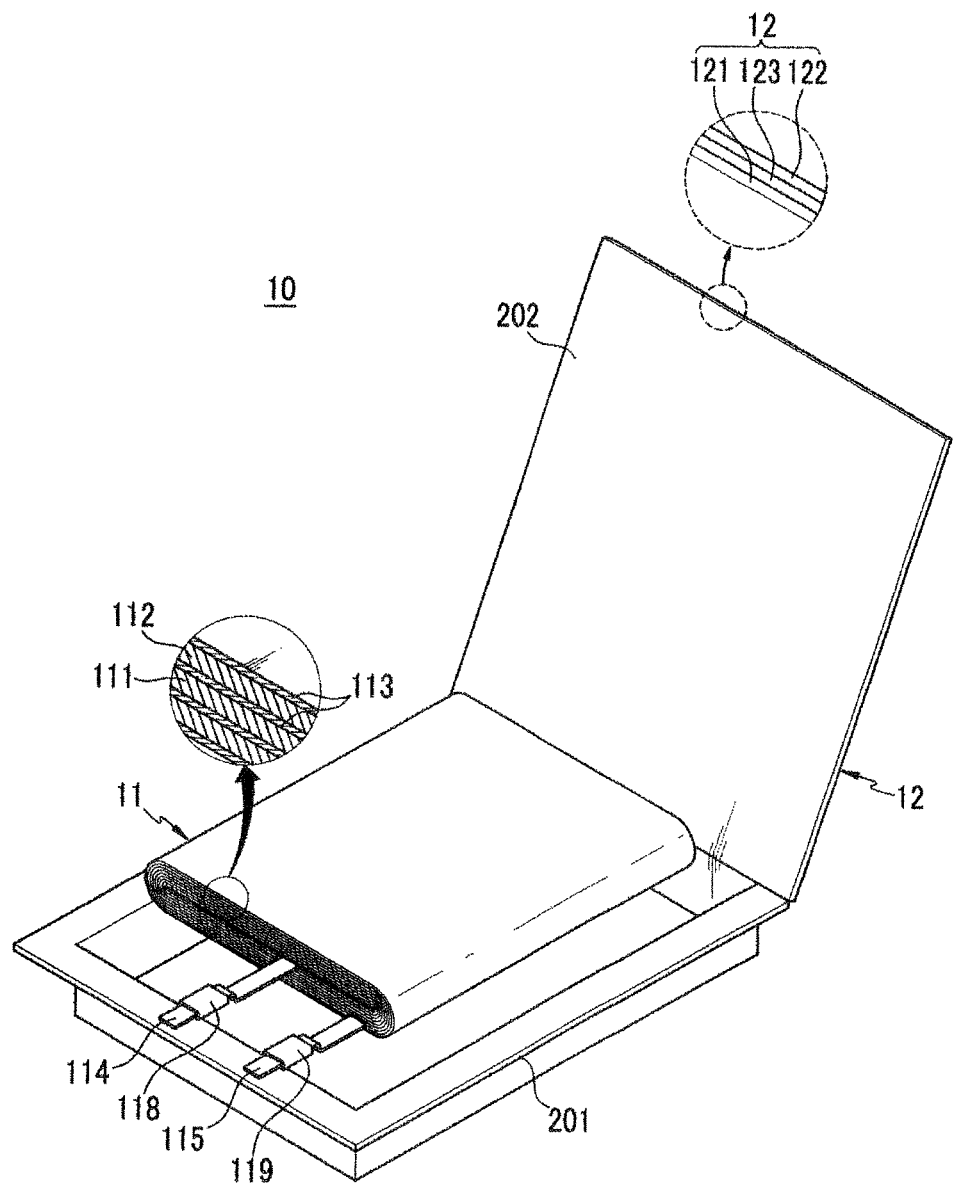
FIG. 3 is an exploded perspective view of a bare cell accommodated in the rechargeable battery pack of FIG. 1.

FIG. 3 is an exploded perspective view of a pouch type bare cell accommodated in the rechargeable battery pack of FIG. 1. With reference to FIG. 3, the bare cell 10 includes electrode assembly 11, which performs charging and discharging, and a pouch 12 accommodating the electrode assembly 11 therein.

The electrode assembly 11 has a jelly roll shape by disposing a first electrode ('positive electrode' for the sake of convenience) 111 and a second electrode ('negative electrode' for the sake of convenience) 112 with a separator 113 interposed therebetween and winding them. The separator 113 maybe formed as a polymer film allowing lithium ions to pass therethrough.

The pouch 12 may have a multi-sheet structure covering the exterior of the electrode assembly 11. For example, the pouch 12 includes a polymer sheet 121 forming an inner surface of the pouch 12 and performing insulation and heat fusion, a PET (polyethyleneterephthalate) sheet, a nylon sheet- or a PET-nylon composite sheet 122 (hereinafter, 'nylon sheet' will be described as an example for the sake of convenience) forming an outer surface to protect the pouch, and a metal sheet 123 providing mechanical strength. The metal sheet 123 is interposed between the polymer sheet 121 and the nylon sheet 122 and may be formed as, for example, an aluminum sheet.

Also, the pouch 12 includes a first exterior member 201 accommodating the electrode assembly 11 and a second exterior member 202 covering the electrode assembly 11 and heat-fused to the first exterior member 201 at an outer side of the electrode assembly 11. The first and second exterior members 201 and 202 may be formed of the polymer sheet 121, the nylon sheet 122, and the metal sheet 123 having the same structure.

For example, the first exterior member 201 is formed to have a recess structure to accommodate the electrode assembly 11, and the second exterior member 202 is formed to be flat to cover the electrode assembly 11 accommodated in the first exterior member 201.

Also, the electrode assembly 11 is formed as a flat plate type electrode assembly, and accordingly, the pouch 12 is formed as a rectangular flat type pouch. The bare cell 10 is formed by surrounding the electrode assembly 11 with the pouch 12, the bare cell 10 is formed as a rectangular flat type bare cell overall.

The electrode assembly 11 further includes positive electrode lead tab 114 connected to an uncoated portion of the positive electrode 111 and negative lead tab 115 connected to an uncoated portion of the negative electrode 112. For example, the positive electrode lead tab 114 and the negative electrode lead tab 115 may be connected to the same lateral surface of the electrode assembly 11 and led out of the same lateral surface of the pouch 12.

With reference back to FIGS. 1 and 2, the positive lead tab 114 and the negative electrode lead tab 115 are disposed in a penetrative manner between the first and second exterior members 201 and 202 heat-fused in the end portion 124 formed at one side of the pouch 12.

Here, the positive electrode lead tab 114 and the negative electrode lead tab 115 are electrically connected to the pouch 12 by insulating members 118 and 119, respectively.

Also, the end portion 124 may be formed by heat-fusing an end portion of the first exterior member 201 bent along the electrode assembly 11 to a planar end portion of the second exterior member 202 facing the end portion of the first exterior member 201, at the side from which the positive lead tab 114 and the negative lead tab 115 are led out.

Thus, the end portion 124 includes the first surface portion 125 formed on a lateral surface of the pouch 12 corresponding to one section of the electrode assembly 11 and the second surface portion 126 connected at a right angle to the first surface portion 125 and formed as a heat-fused plane of the pouch 12.

In the state of FIG. 3, when the first and second exterior members 201 and 202 are heat-fused and reversed, the bare cell 10 in the state of FIGS. 1 and 2 is formed. The protection circuit module (PCM) 20 may be attached to the bare cell 10 in the state of FIGS. 1 and 2.

In order to protect the bare cell 10 against an overcharge, an overdischarge, an overcurrent, and an external short, the protection circuit module 20 is formed by forming a protection circuit on a substrate and mounting protection elements 21 on the protection circuit.

Figure 4A:
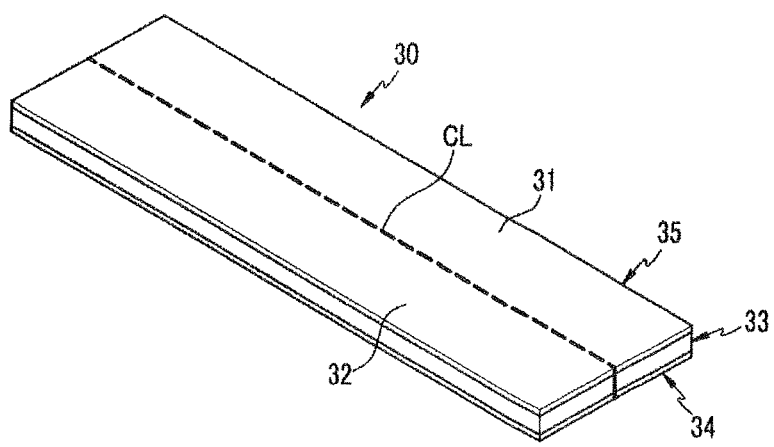
FIG. 4A is an unfolded perspective view of a insulating member.
Figure 4B:
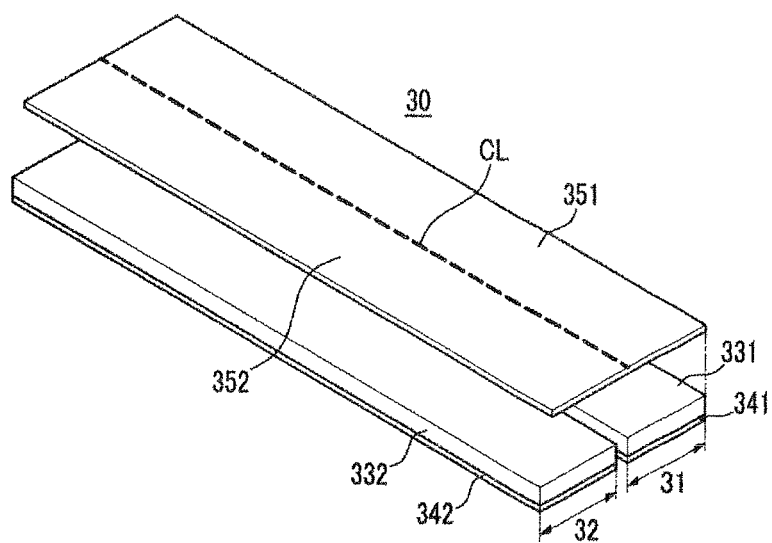
FIG. 4B is an exploded perspective view of the insulating member.
Figure 4C:
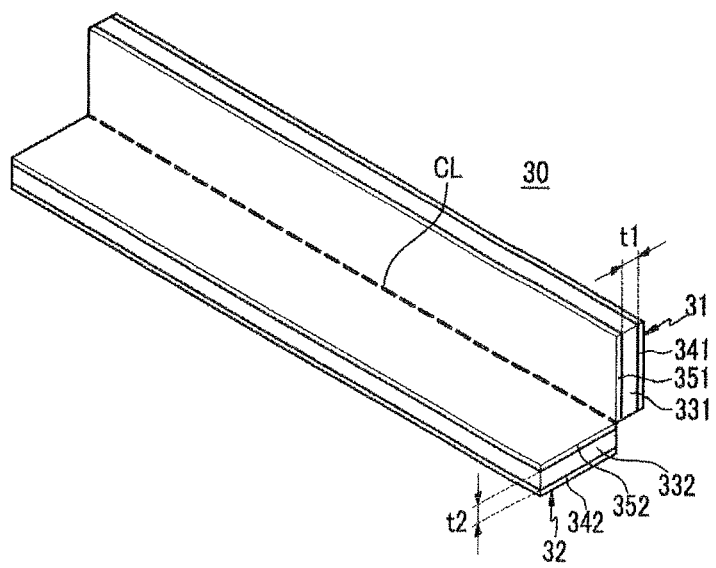
FIG. 4C is a perspective view showing a bent state of the insulating member.

FIG. 4A is an unfolded perspective view of an insulating member, FIG. 4B is an exploded perspective view of the insulating member, and FIG. 4C is a perspective view showing a bent state of the insulating member. With reference to FIGS. 1, 2, and 4A-4C, the insulating member 30 may be bent at a right angle, and formed to firmly maintain the bent state.

Namely, the insulating member 30 has the first portion 31 and the second portion 32 which are demarcated by a perforated line CL, as shown in FIG. 4A.

The insulating member 30 includes a buffer portion 33 stacked, in a depth direction of the insulating member 30, on an adhesive layer 34 and an insulating layer 35 stacked on the buffer portion 33.

The insulating layer 35 may be formed of PET(polyethyleneterephthalate). The insulating layer 35 and the buffer portion 33 may be coupled.

For example, the perforated line CL may be formed only on the insulating layer 35, as shown. In addition, the perforated line CL may be formed on both the insulating layer 35 and at least part of the buffer portion 33 (not shown).

The buffer portion 33 and the adhesive layer 34 may be completely cut through in a depth direction of the insulating member 30, as shown in FIG. 4B. Accordingly, the buffer portion 33 may be separated with a first buffer portion 331 positioned in the first portion 31 and a second buffer portion 332 positioned in the second portion 32.

Accordingly, the adhesive layer 34 may include a first adhesive layer 341 attached to the first buffer portion 331 and a second adhesive layer 342 attached to the second buffer portion 332.

The perforated line CL is formed of a plurality of holes which are formed on the insulating layer 35 which includes a first insulating layer 351 positioned on the first buffer portion 331 and a second insulating layer 352 positioned on the second buffer portion 332.

Accordingly, the perforated line CL allows the first and second portions 31 and 32 to be bent at a right angle when the insulating member 30 is attached to the end portion 124 of bare cell 10. The first adhesive layer 341 and the second adhesive layer are in a separated state, the first buffer portion 331 and the second buffer portion 332 are in a separated state, and the first and second insulating layers remain connected at a right angle to each other along perforated line CL.

Thus, the first and second portions 31 and 32 are easily attached to the first surface portion 125 and the second portion surface 126, respectively, at the end portion 124 of bare cell 10, and the attached state thereof can be firmly maintained.

Namely, a force of restitution by elasticity of the insulating member 30 may be reduced or eliminated, so a phenomenon that the insulating member 30 is separated to come off from the right-angle corner set by the first surface portion 125 and the second portion 126 can be reduced. Thus, attachment performance of the protection circuit module 20 attached to the insulating member 30 can be enhanced.

With reference to FIG. 4C, the first buffer portion 331 may be formed to have a thickness t1, and the second buffer portion 332 may be formed to have a second thickness t2 greater than the first thickness t1. As the second thickness t2 of the second buffer portion 332 is increased, the protection circuit module 20 and the protection elements 21 can be further effectively protected against vibration and impact. Also, the first and second buffer portions 331 and 332 may have the same thickness (not shown). In this case, the buffer portion 33 and the insulating member 30 may be easily fabricated.

Figure 5:
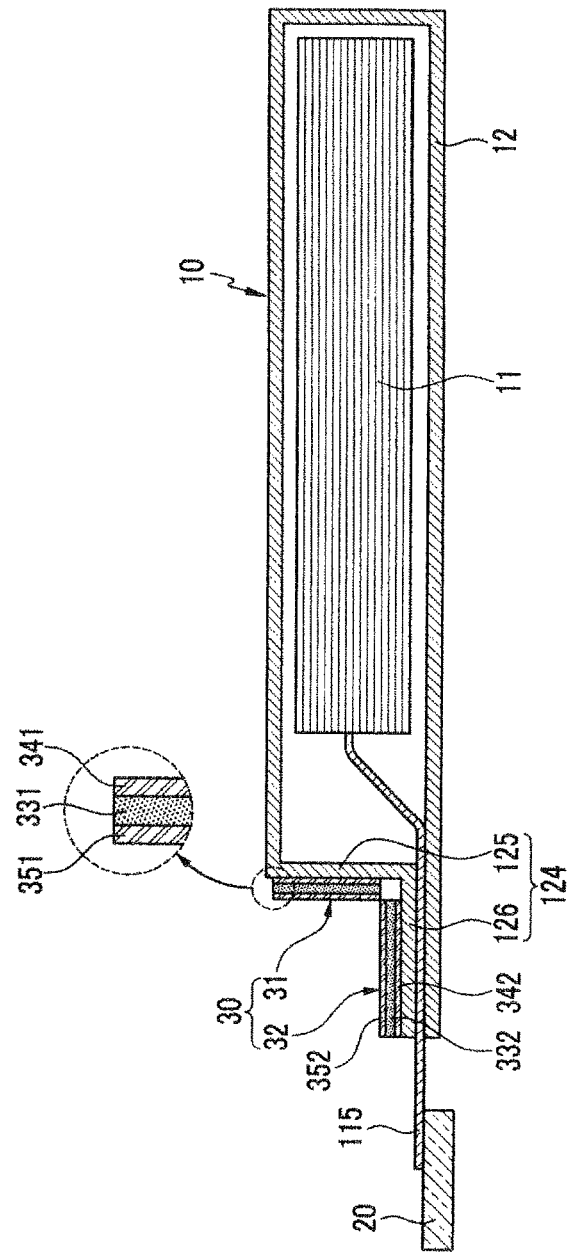
FIG. 5 is a cross-sectional view taken along line V-V by combining the rechargeable battery pack illustrated in FIG. 1.

FIG. 5 is a cross-sectional view taken along line V-V of the combined rechargeable battery pack illustrated in FIG. 1.

With reference to FIGS. 1 and 5, the protection circuit module 20 is welded and electrically connected to the positive and negative electrode lead tabs 114 and 115 extending out from the bare cell 10.

The insulating member 30 is attached to the first surface portion 125 and the second surface portion 126 of end portion 124. The protection circuit module 20 may be positioned on the second surface portion 126 through the second portion 32, as shown in FIG. 6.

That is, the first adhesive layer 341 of adhesive layer 34 is positioned on the first surface portion 125, and the second adhesive portion 342 of adhesive layer 34 is positioned on the second surface portion 126.

Figure 6:
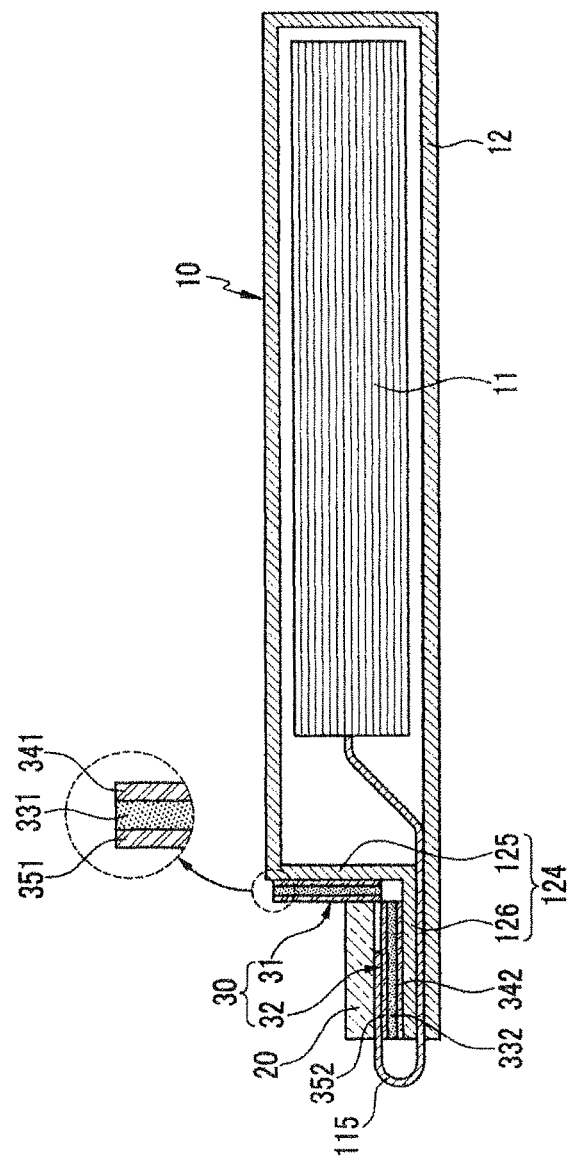
FIG. 6 is a cross-sectional view taken along line VI-VI in FIG. 2.

FIG. 6 is a cross-sectional view taken along line VI-VI in FIG. 2.

With reference to FIGS. 2 and 6, as the positive and negative electrode lead tabs 114 and 115 are bent, the protection circuit module 20 is attached to the second portion 32 of the insulating member 30.

Figure 7:
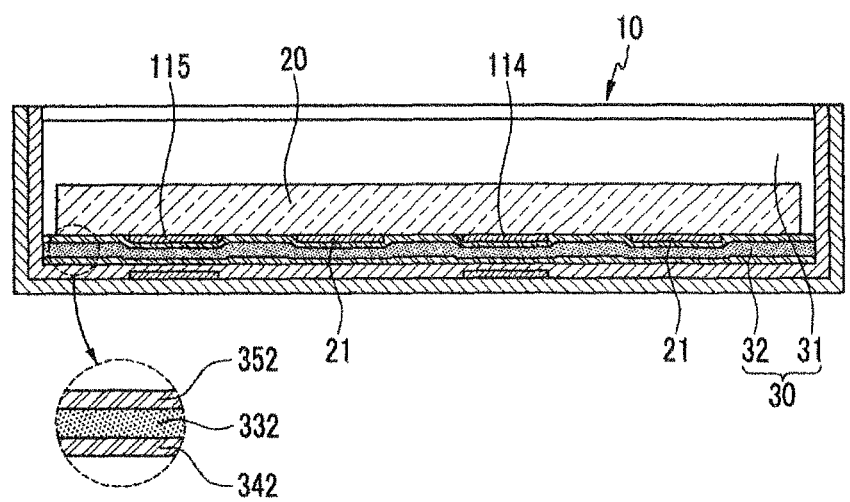
FIG. 7 is a cross-sectional view taken along line VII-VII in FIG. 2.

Note, the second portion 32 will be partially compressed to allow the protection circuit module 20 to be positioned on the second surface portion 126, as shown in better detail with respect to FIG. 7.

The back surface portion 22 of protection circuit module 20 on which the protection elements 21 are installed contacts the second insulating layer 352 of the second portion 32 and an edge of the protection circuit module 20 contacts the first insulating layer 351 of the first portion 31.

Thus, the protection circuit module 20 is stably positioned on the end portion 124, since the first adhesive portion 341 and the second adhesive portion 342 are respectively attached to the first surface portion 125 and the second surface portion 126 of end portion 124.

FIG. 7 is a cross-sectional view taken along line VII-VII in FIG. 2.

With reference to FIG. 7, as the protection circuit module 20 is attached to the second portion 32, the positive and negative lead tabs 114 and 115 as well as the protection elements 21, protruded from the back surface portion 22 of protection circuit module 20, will compress portions of the second portion 32.

In particular, the buffer portion 33 may form the majority of the thickness of the insulating member 30, and will allow the positive and negative lead tabs 114 and 115 as well as the protection elements 21 to compress corresponding portions of second buffer portion 332 which absorbs vibration of an impact transferred from the bare cell 10 or the end portion 124 to the protection circuit module 20. For example, the buffer portion 33 may be made of an expandable cushion material, e.g., an urethane foam.

Figure 8:
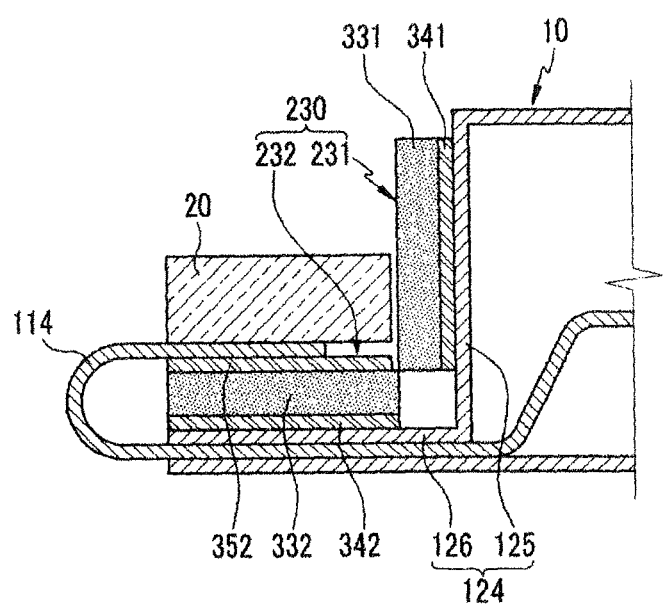
FIG. 8 is a partial sectional view of a rechargeable battery pack according to a second embodiment of the present invention.

FIG. 8 is a partial sectional view of a rechargeable battery pack according to a second embodiment of the present invention.

With reference to FIG. 8, in comparison to the first embodiment, an insulating member 230 of the second embodiment may not have an insulating layer on the first surface portion 125.

According to the insulating member 230 of the present exemplary embodiment, the first portion 231 may include the first buffer portion 331 and the first adhesive layer 341. In addition, the second portion 232 may include the second buffer portion 332, the second adhesive layer 342 and the second insulating layer 352.

Thus, the first and second adhesive layers 341 and 342 of the insulating member 230 attaches the first and second buffer portions 331 and 332 to each of the first surface portion 125 and the second surface portion 126, respectively. Here, the first and second buffer portions 331 and 332 may be partially or completely cut through in a depth direction of the insulating member 230.

The insulating layer 352 electrically insulates the protection circuit module 20 from the second surface portion 126.

The back surface portion 22 of the protection circuit module 20 on which the protection elements 21 are mounted is positioned on the second surface portion 126, and an edge portion of the protection circuit module 20 may not be attached to the first surface portion 125 or may be spaced apart from the first surface portion 125.

Figure 9:
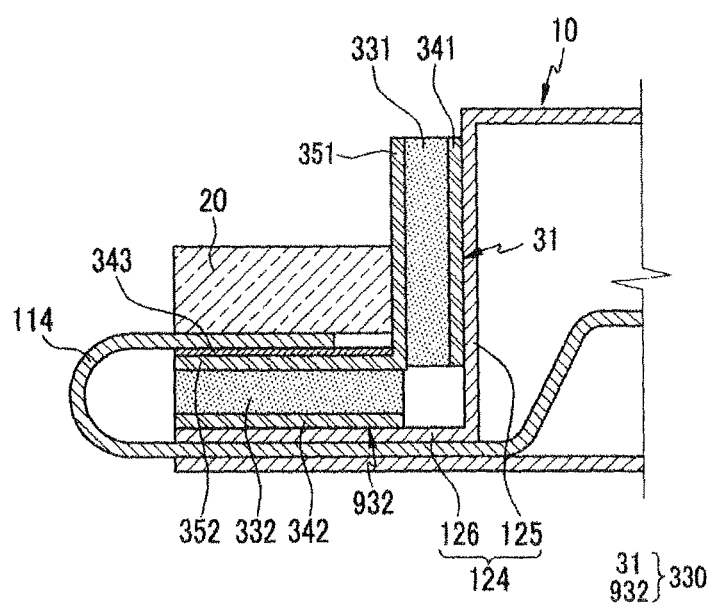
FIG. 9 is a partial sectional view of a rechargeable battery pack according to a third embodiment of the present invention.

FIG. 9 is a partial sectional view of a rechargeable battery pack according to a third embodiment of the present invention.

With reference to FIG. 9, in comparison to the first embodiment, an insulating member 330 of the third embodiment further includes a third adhesive layer 343 positioned on the second insulating layer 352 of a second portion 932 of insulating member 330.

That is, according to the present exemplary embodiment, the first portion 31 may include the first buffer portion 331, the first adhesive layer 341 and the first insulating layer 351. In addition, the second portion 932 may include the second buffer portion 332, the second adhesive layer 342, the second insulating layer 352 and the third adhesive layer 343.

In this case, the first and second buffer portions 331 and 332 may be disposed separately on the first and second portions 31 and 932.

Here, the third adhesive layer 343 is formed only on the second insulating layer 352 of the second portion 932. Alternatively, adhesive layer 343 may be attached over both the first and second insulating layers 351 and 352.

Thus, the first and second adhesive layers 341 and 342 of the insulating member 330 attaches the first and second buffer portions 331 and 332 to the first surface portion 125 and the second surface portion 126.

The third adhesive layer 343 attaches the protection circuit module 20 to the second insulating layer 352 of the second portion 932 atop of second surface portion 126.

Accordingly, the protection circuit module 20 may be stably positioned on the second insulating layer 352 and electrically insulated from second surface portion 126.

Figure 10A:
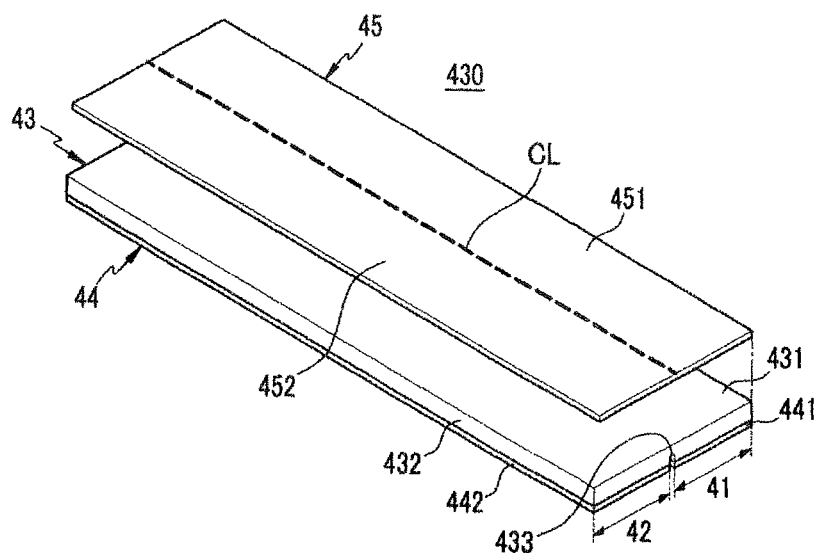
FIG. 10A is an exploded perspective view of the insulating member.
Figure 10B:
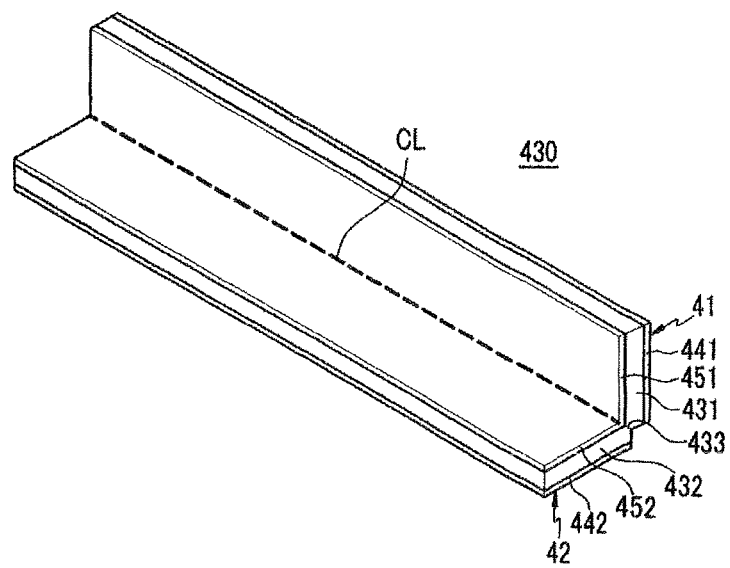
FIG. 10B is a perspective view showing a bent state of the insulating member according to a third embodiment of the present invention.

FIG. 10A is an exploded perspective view of an alternative insulating member, and FIG. 10B is a perspective view showing a bent state of the insulating member according to a fourth embodiment of the present invention.

Referring to FIGS. 10A and 10B, an insulating member 430 of the present exemplary embodiment has an area facing with the end portion 124 of the bare cell 10. The insulating member 430 includes a first portion 41 and a second portion 42 which include an adhesive layer 44, a buffer portion 43 and an insulating layer 45.

The first portion 41 includes a first adhesive layer 441, a first buffer portion 431 and a first insulating layer 451.

The second portion 42 includes a second adhesive layer 442, a second buffer portion 432 and a second insulating layer 452.

The adhesive layer 44 includes first and second adhesive layers 441 and 442 which may be separately formed.

The buffer portion 43 includes first and second buffer portions 431 and 432 which may be integrally formed. The buffer portion 43 may be partially cut through at a hinge portion 433.

The insulating layer 45 includes first and second insulating layers 451 and 452 which may be integrally formed and may be demarcated by perforated line CL. Hinge portion 433 is aligned with perforated line CL. The adhesive layer 44 is not formed or positioned in direct alignment with hinge portion 433.

According to the present exemplary embodiment, a resilience force on the insulating member 430 may be reduced since the first and second portions 41 and 42 are physically connected via the hinge portion 433.

In addition, the first and second insulating layers 451 and 452 are stably connected with the first and second buffer portions 431 and 432, since the hinge portion 433 is in alignment with perforated line CL.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   a bare cell having an end portion including a first surface portion and a second surface portion projecting from the first surface portion;
   an insulating member including a first insulating portion attached to the first surface portion and a second insulating portion attached to the second surface portion, the first insulating portion forming an angle with the second insulating portion, the first insulating portion being demarcated from the second insulating portion by a perforated line; and a protection circuit module electrically connected to the bare cell, the protection circuit module being disposed on the insulating member.

2. The rechargeable battery as set forth in claim 1, further comprising an adhesive layer disposed between the second insulating portion and the protection circuit module.

3. The rechargeable battery as set forth in claim 1:
the first insulating portion including:
a first adhesive layer attached to the first surface portion; and
a first buffer portion formed on the first adhesive layer; and
the second insulating portion including:
a second adhesive layer attached to the second surface portion; and
a second buffer portion formed on the second adhesive layer.

4. The rechargeable battery as set forth in claim 3, the first insulating portion further including a first insulating layer formed on the first buffer portion.

5. The rechargeable battery as set forth in claim 4, the second insulating portion further including a second insulating layer formed on the second buffer portion.

6. The rechargeable battery as set forth in claim 5, the first insulating layer being demarcated from the second insulating layer by a perforated line.

7. The rechargeable battery as set forth in claim 6, further comprising a hinge portion connecting the first buffer portion to the second buffer portion, the hinge portion being aligned with the perforated line.

8. The rechargeable battery as set forth in claim 7, further comprising a third adhesive layer disposed between the second insulating layer and the protection circuit module.

9. The rechargeable battery as set forth in claim 3, the first buffer portion being partially separated from the second buffer portion.

10. A rechargeable battery comprising:
a bare cell including an electrode assembly, the bare cell having an end portion including a first surface portion and a second surface portion projecting from the first surface portion;
the electrode assembly having a positive lead tab and a negative lead tab protruding through the second surface portion of the end portion;
an insulating member including a first insulating portion attached to the first surface portion and a second insulating portion attached to the second surface portion, the first insulating portion forming an angle with the second insulating portion, the first insulating portion being demarcated from the second insulating portion by a perforated line; and
a protection circuit module electrically connected to the positive and negative lead tabs at a back surface portion of the protection circuit module, the back surface portion being disposed on the second insulating portion of the insulating member attached to the second surface portion, the positive and negative lead tabs deforming corresponding portions of the second insulating portion of the insulating member.

11. The rechargeable battery as set forth in claim 10, further comprising:
the first insulating portion including:
a first adhesive layer attached to the first surface portion; and
a first buffer portion formed on the first adhesive layer;
the second insulating portion including:
a second adhesive layer attached to the second surface portion; and
a second buffer portion formed on the second adhesive layer.

12. The rechargeable battery as set forth in claim 11, the first insulating portion further including a first insulating layer formed on the first buffer portion.

13. The rechargeable battery as set forth in claim 12, the second insulating portion further including a second insulating layer formed on the second buffer portion.

14. The rechargeable battery as set forth in claim 13, the first insulating layer being demarcated from the second insulating layer by a perforated line.

15. The rechargeable battery as set forth in claim 10, further comprising an adhesive layer disposed between the second insulating portion and the protection circuit module.

16. The rechargeable battery as set forth in claim 14, further comprising a hinge portion connecting the first buffer portion to the second buffer portion, the hinge portion being aligned with the perforated line.

17. The rechargeable battery as set forth in claim 16, further comprising a third adhesive layer disposed between the second insulating layer and the protection circuit module.

18. The rechargeable battery as set forth in claim 11, the first buffer portion being partially separated from the second buffer portion.

* * * * *